United States Patent [19]
Iida

[11] Patent Number: 4,685,508
[45] Date of Patent: Aug. 11, 1987

[54] AUTOMOTIVE AIR-CONDITIONING APPARATUS WITH DEMIST CONTROL

[75] Inventor: Katumi Iida, Saitama, Japan

[73] Assignee: Diesel Kiki Co., Ltd., Tokyo, Japan

[21] Appl. No.: 784,248

[22] Filed: Oct. 4, 1985

[30] Foreign Application Priority Data

Oct. 12, 1984 [JP] Japan .................................. 59-212675

[51] Int. Cl.$^4$ ............................................ G05D 21/00
[52] U.S. Cl. ...................................... 165/17; 98/2.09;
62/227; 165/28; 165/43
[58] Field of Search ........................ 165/17, 21, 28, 42,
165/43; 98/2.08, 2.09; 62/173, 227

[56] References Cited

U.S. PATENT DOCUMENTS

| | | | |
|---|---|---|---|
| 4,412,424 | 11/1983 | Iida et al. | 98/2.09 X |
| 4,424,933 | 1/1984 | Sutoh et al. | 165/21 X |
| 4,448,034 | 5/1984 | Shimada et al. | 98/2.09 X |
| 4,466,480 | 8/1984 | Ito et al. | 165/30 X |
| 4,476,919 | 10/1984 | Akimoto et al. | 165/30 X |
| 4,519,443 | 5/1985 | Sutoh et al. | 165/17 |

FOREIGN PATENT DOCUMENTS

| | | | |
|---|---|---|---|
| 3,333,907 | 4/1985 | Fed. Rep. of Germany | 165/17 |
| 53-49143 | 11/1978 | Japan . | |
| 56-108911 | 8/1981 | Japan . | |
| 0070721 | 5/1982 | Japan | 98/2.09 |
| 0077210 | 5/1982 | Japan | 98/2.09 |
| 0099410 | 6/1982 | Japan | 98/2.08 |
| 0182509 | 11/1982 | Japan | 98/2.08 |

Primary Examiner—Albert W. Davis, Jr.
Assistant Examiner—Randolph A. Smith
Attorney, Agent, or Firm—Wenderoth, Lind & Ponack

[57] ABSTRACT

An automotive air-conditioning apparatus has an air blower and an air mixing damper for adjusting the ratio of a mixture of cool air and hot air. The temperature of air in the automobile cabin is controlled dependent on the amount of air fed from the air blower and the opening of the air mixing damper. In a demisting mode, the amount of air from the air blower is greater than that in a normal temperature adjusting mode, and the opening of the air mixing damper is controlled dependent on ambient-air conditions.

2 Claims, 6 Drawing Figures

AUTOMOTIVE AIR-CONDITIONING APPARATUS WITH DEMIST CONTROL

BACKGROUND OF THE INVENTION

The present invention relates to an automotive air-conditioning apparatus for air-conditioning the interior cabin of an automobile, and more particularly to an automotive air-conditioning apparatus for increasing the amount of air fed from an air blower in a demisting mode so as to be greater than the amount of air fed from the air blower in an automatic adjusting mode and for controlling the opening of an air mixing damper dependent on an ambient-air temperature.

Automotive air-conditioning apparatus have heretofore been employed to air-condition the automobile passenger compartment or cabin and also prevent the front windshield from getting frosted for thereby giving the driver clear visibility through the front windshield to allow the driver to drive the automobile with safety. One such automotive air-conditioning apparatus is disclosed in Japanese Laid-Open Utility Model Publication No. 56-108911 published on Aug. 24, 1981. The disclosed automotive air-conditioning apparatus operates in a demisting mode by controlling an air mixing damper in a maximum heating mode and controlling an air blower to supply a maximum amount of air. More specifically, the air-conditioning apparatus includes a first control circuit for automatically controlling the air mixing damper to adjust the ratio of a mixture of cool air and hot air, and a second control circuit for selectively controlling the air mixing damper in a full cooling mode or a full heating mode. When the full cooling mode or the full heating mode is selected, the air mixing damper control system is separated from the first control circuit, and is controlled only by the second control circuit. The second control circuit is also capable of rotating the air blower at a high speed. When the second control circuit is selected, it enables the air blower to rotate at a high speed.

With the disclosed arrangement, however, when the full cooling mode or the full heating mode is selected, the automobile cabin is brought into a maximum cooling mode or a maximum heating mode irrespectively of ambient air conditions. This prevents the automobile cabin from being air-conditioned for the best comfort of the driver and passengers, if any, especially during seasons of comfortable weather.

Japanese Utility Model Publication No. 53-49143 published on Nov. 25, 1978 reveals an automobile demister or defroster for discharging maximum heating air from a demisting-air outlet by generating a signal for a maximum heating capability when the front windshield is to be demisted. The disclosed automobile demister includes a switch connected to thermosensitive resistors, for example, and interlinked with a manual selector. When the manual selector is in a demisting position, it produces the aforesaid signal to open the demisting-air outlet to introduce hot air into the automobile cabin.

The automobile demister of the above construction is however disadvantageous in that since the demisting control is performed independently of ambient air conditions, the automobile cabin cannot be air-conditioned as desired, and the driver and passengers, if any, will feel excessively hot.

SUMMARY OF THE INVENTION

It is an object of the present invention to provide an automotive air-conditioning apparatus for increasing the amount of heated air fed from an air blower in a demisting mode so as to be greater than the amount of air fed by the air blower when the cabin air temperature is automatically adjusted and for controlling the opening of an air mixing damper to a limit value dependent on an ambient-air temperature, so that the driver and passengers, if any, will not feel excessively hot and will remain comfortable without being supplied with excessively hot air.

According to the present invention, the above object can be achieved by an automobile air-conditioning apparatus in an automobile having a cabin, comprising an intake damper disposed in a duct, an air blower disposed in the duct for recirculating air in the cabin or forcibly introducing ambient air into the cabin under the control of the intake damper, the air blower including a drive source of its own, a cooling system including an evaporator disposed in the duct downstream of the air blower, a heater core disposed in the duct downstream of the evaporator for heating air fed from the evaporator, an air mixing damper disposed in the duct upstream of the heater core for controlling the amount of air supplied from the evaporator to the heater core, a mode selector damper means disposed in the duct downstream of the heater core for selectively opening and closing a demisting-air outlet, a first outlet for discharging air into a relatively upper portion of the cabin, and a second outlet for discharging air into a relatively lower portion of the cabin, and a control system for controlling the amount of air fed from the air blower and the opening of the air mixing damper dependent on the difference between a preset temperature and the temperature of air in the cabin to automatically adjust the temperature of air in the cabin in an automatic adjusting mode, the control system being responsive to selection of a demisting mode with the demisting-air outlet being open for controlling the drive source to increase the amount of air fed from the air blower so as to be greater than the amount of air fed from the air blower in the automatic adjusting mode.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
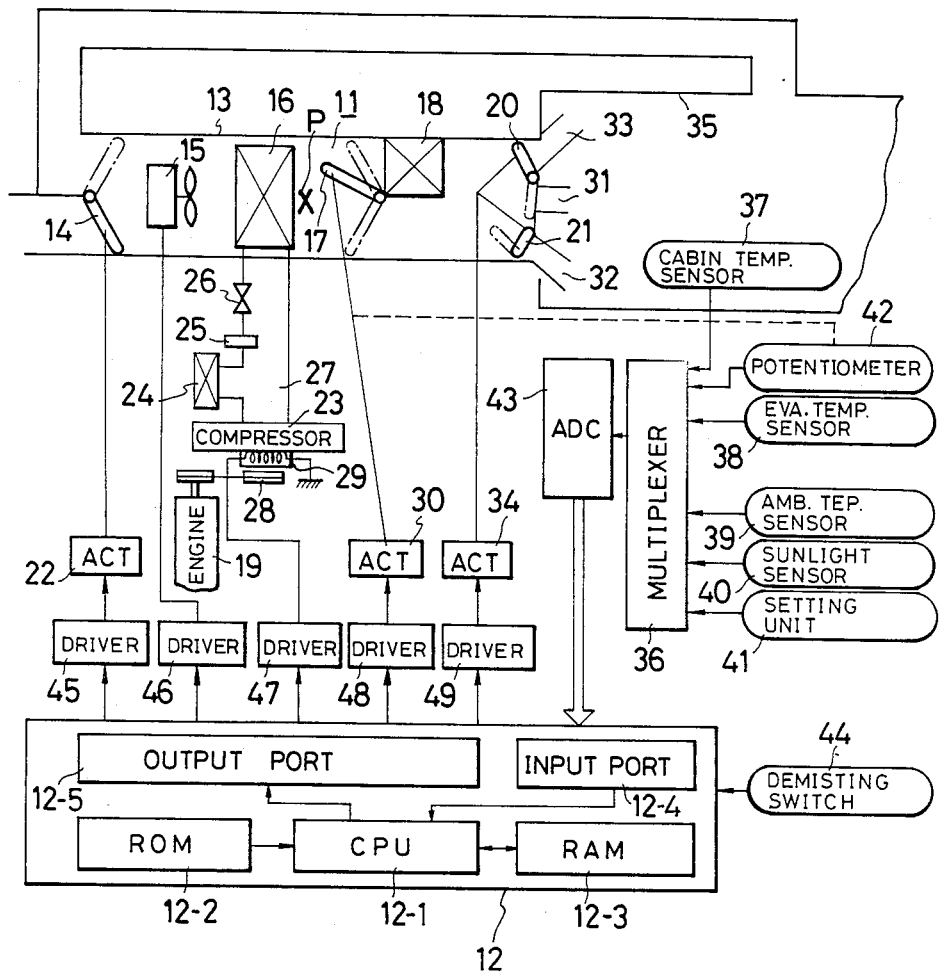
FIG. 1 is a block diagram of a control system in an automotive air-conditioning apparatus according to the present invention.

FIG. 1 shows an automotive air-conditioning apparatus according to the present invention. The air-conditioning apparatus includes an air-conditioning assembly 11 and a control system means 12 comprising a microcomputer for controlling the air-conditioning assembly 11.

The air-conditioning assembly 11 comprises an intake damper 14 for drawing in air from the upstream end of duct means comprising a duct 13, an air blower 15 for feeding air from the intake damper 14 into an automobile compartment or cabin 35, an evaporator 16, and an air mixing damper 17 for controlling the amount or proportion of air to be guided into a heater core 18 from the evaporator 16, the heater core 18 serving as a heater supplied with cooling water which has been heated by an internal combustion engine 19 mounted on the automobile. In the downstream end of the duct 13, there are provided mode selector damper means comprising two mode selector dampers 20, 21 for selecting a vent (first) outlet 31 for discharging air into a relatively upper portion of the automobile cabin, a heated-air (second) outlet 32 for discharging heated air into a relatively lower portion of the automobile cabin, and a demisting-air outlet 33 for discharging demisting air into the automobile cabin.

The intake damper 14 is controlled by a motor actuator 22 so that when the intake damper 14 is closed, air recirculates in the automobile cabin 35, and when the intake damper 14 is open, fresh ambient air is introduced into the automobile cabin 35. The air introduced through the intake damper 14 passes through the evaporator 16 by which the air is cooled when a cooling unit 27 including the evaporator 16 is in operation. The cooling unit 27 is composed of the evaporator 16, a compressor 23, a condensor 24, a receiver tank 25, and an expansion valve 26, which are interconnected by a coolant pipe. The internal combustion engine 19 has an output shaft operatively coupled to a pulley 28 connected through a magnetic clutch 29 to the compressor 23. When the rotation of the pulley 28 is transmitted through the magnetic clutch 29 to the compressor 23, the compressor 23 compresses the coolant as it is fed through the coolant pipe.

The air mixing damper 17 is controlled by a motor actuator means 30 to control the amount of air separated or proportion of air from the air having passed through the evaporator 16 so as to pass through the heater core 18.

The demisting-air outlet 33 is arranged to discharge demisting air along the inner surface of the windshield. The vent outlet 31 is arranged to direct air toward the face of the driver. The heated-air outlet 32 is arranged to direct hot air toward the feet of the driver. The outlets 31, 32, 33 are selectively controlled by the mode selector dampers 20, 21 for discharging air into the automobile cabin. The mode selector dampers 20, 21 are driven by a motor actuator 34.

A cabin-air temperature sensor means 37 is positioned in the automobile cabin 35 at a location where the representative cabin-air temperature can be detected. An evaporator-temperature sensor means 38 is provided for detecting the temperature of air having passed through the evaporator 16, i.e., the temperature of air at a position P just downstream of the evaporator 16. An ambient-air temperature sensor means 39 is attached to the back surface of a bumper, for example. A sunlight sensor 40 for detecting the amount of sunlight falling on the automobile is disposed on the dashboard. A temperature setting unit means 41 is provided for establishing a temperature setting for the automobile cabin 35. The opening of the air mixing damper 17 is electrically detected by a potentiometer 42.

The output signals from the cabin-air temperature sensor 37, the evaporator-temperature sensor 38, the ambient-air temperature sensor 39, the sunlight sensor 40, the temperature setting unit 41, and the potentiometer 42 are supplied through a multiplexer 36 to an A/D converter (hereinafter referred to as "ADC") 43 by which the signals are converted to digital data items. The digital data items from the ADC 43 are delivered to the control system 12. The control system 12 is also supplied with at least the output signal from a demisting switch 44 which initiates a demisting mode.

The control system 12 is connected through drivers 45, 46, 47, 48, and 49 to the motor actuator 22, the motor of the air blower 15, the magnetic clutch 29, the motor actuator 30, and the motor actuator 34, respectively, for energizing them with output signals applied through the drivers 45 through 49 from the control system 12.

The control system 12 is basically composed of a CPU 12-1, a ROM 12-2 for storing a program, a RAM 12-3 for storing data, an input port 12-4, and an output port 12-5. The control system 12 operates by referring to the output data items from the ADC 43 to control the drivers 46, 47, 48 through the output port 12-5 for controlling the cabin-air temperature so as to be equal to the temperature setting established by the temperature setting unit 41. The driver or drive source 46 controls the r.p.m. of the motor of the air blower 15 to adjust the amount or flow rate of air fed by the air blower 15. The control system 12 also controls the driver 47 to control the engagement and disengagement of the magnetic clutch 29 for adjusting the timing and interval of operation of the cooling unit 27. The control system 12 also controls the driver 48 to control the opening of the air mixing damper 17 for adjusting the amount of air directed to the heater core 18. The control system 12 also controls the driver 49 to control the mode selector dampers 20, 21 for selecting a desired mode.

The driver 45 is energized by the output signal of a manually operated intake-damper control switch (not shown), which is supplied to the control system 12. The intake damper 14 is controlled by the driver 45 selectively into an air recirculating mode or an air introducing mode. The control of the intake damper 14 by the manually operated intake-damper control switch will not be described in greater detail as it can easily be understood.

Figure 2:
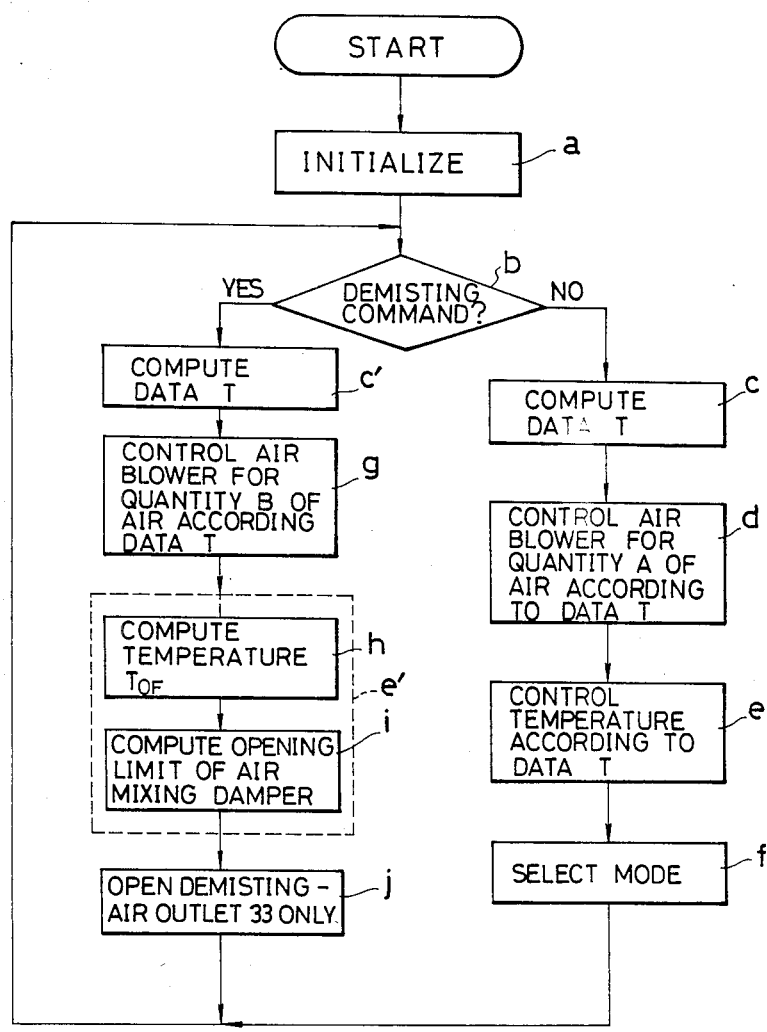
FIG. 2 is a flowchart of successive steps of operation of the control system shown in FIG. 1.

Controlling operation effected by the control system 12 under the direction of the program stored in the ROM 12-2 will be described with reference to the flowchart of FIG. 2 and the graphs of FIGS. 3(a) through 3(d).

The program starts being executed by closing an ignition switch (not shown). In a step a, initialization is performed to clear the data stored in the RAM 12-3. Then, the output signal from the demisting switch 44 is read through the input port 12-4 into the CPU 12-1 and stored in the RAM 12-3. The CPU 12-1 determines in a step b whether there is a demisting command or not.

If there is no demisting command, then the output signals from the ADC 43 are read through the input port 12-4 and stored at a prescribed area in the RAM 12-3. Combined data T is computed and stored in a step c. The combined data T is computed according to the following equation:

$$T = T_1 + aT_A + bT_{SU} + cT_E - dT_S + k \quad (1)$$

where $T_1$ is the cabin-air temperature detected by the cabin-air temperature sensor 37, $T_A$ is the ambient-air temperature detected by the ambient-air temperature sensor 39, $T_E$ is the temperature of air detected by the evaporator-temperature sensor 38 at the outlet of the evaporator 16, $T_{SU}$ is the quantity of sunlight detected by the sunlight sensor 40, $T_S$ is the temperature setting established by the temperature setting unit 41, and a, b, c, d, k are constants. Therefore, the combined data T is equal to the difference between the temperature setting and the cabin-air temperature, as corrected by the ambient-air temperature, the quantity of sunlight, and the evaporator temperature.

Figure 3:
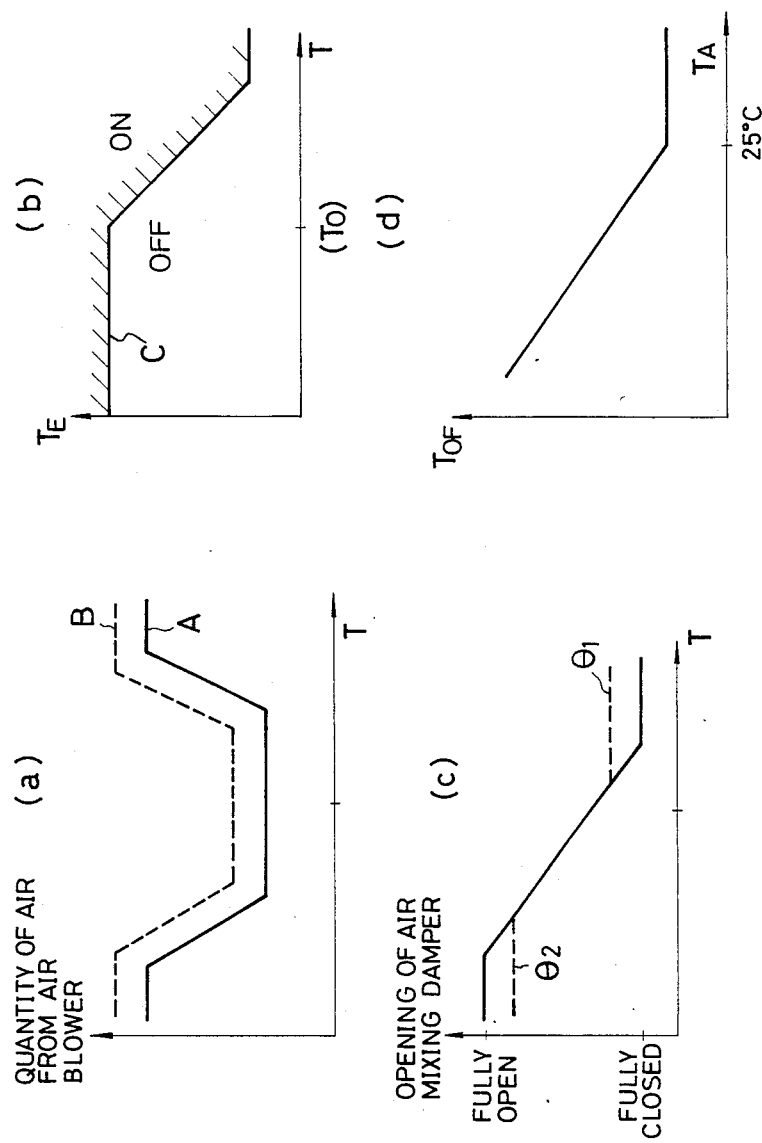
FIG. 3(a) is a graph showing the relationship between the amount of air from an air blower and the combined data.
FIG. 3(b) is a graph showing the relationship between the evaporator temperature and the combined data.
FIG. 3(c) is a graph illustrative of the relationship between the opening of an air mixing damper and the combined data.
FIG. 3(d) is a graph showing the relationship between the required temperature of discharged air and the ambient temperature in a demisting mode.

After the step c, the program goes to a step d in which the quantity A of air to be fed by the air blower 15 is computed according to a preset control pattern, as indicated by the solid line in FIG. 3(a), for the combined data T and the r.p.m. of the motor of the air blower 15 is controlled by the driver 46 to enable the air blower 15 to feed air in the computed quantity A.

Then, the cooling unit 27 and the air mixing damper 17 are controlled to control the amount of heat exchanged by the cooling unit 27 and the amount of heat exchanged by the heater core 18 for thereby controlling the temperature $T_1$ in the automobile cabin in a step e. In the step e, the magnetic clutch 29 is engaged to operate the cooling unit 27 when the evaporator temperature $T_E$ is higher than the temperature indicated by the curve C in FIG. 3(b) corresponding to the combined data T. When the evaporator temperature $T_E$ is equal to or lower than the temperature indicated by the curve C, then the magnetic clutch 29 is disengaged to inactivate the cooling unit 27. The cooling unit 27 is controlled by the control system 12 through the driver 47 as described above. The air mixing damper 17 is controlled by the control system 12 through the driver 48 and the motor actuator 30 so as to be open according to a preset control pattern, as indicated by the solid line in FIG. 3(c), for the combined data T. When the air mixing damper 17 is fully opened, all air having passed through the evaporator 16 is directed to pass through the heater core 18. When the air mixing damper 17 is fully closed, all air having passed through the evaporator 16 is guided into the automobile cabin 36 without passing through the heater core 18.

The step e is followed by the computation of outlet temperature data $T_F$ according to the following equation:

$$T_F = T_E + K_0\theta + \beta \quad (2)$$

where $\theta$ is the opening of the air mixing damper 17, and $K_0$ and $\beta$ are constants. The outlet temperature data $T_F$ is stored at a prescribed area in the RAM 12-3. The mode selector dampers 20, 21 are controlled by the driver 49 and the motor actuator 34 according to the outlet temperature data $T_F$ to select a mode in which to open one or both of the vent outlet 31 and the heated-air outlet 32 in a step f.

If there is a demisting command in the step b, then the output signals from the ADC 43 are read and stored in the RAM 12-3, and combined data T is computed and stored in the RAM 12-3 in a step c'. Then, the quantity A of air to be fed by the air blower 15 is determined according to the same control pattern as in the step d, and a bias is added to the quantity A of air to control the r.p.m. of the motor of the air blower 15 to feed air in the quantity as indicated by the broken line B in FIG. 3(a) in a step g. Therefore, the quantity of air fed from the air blower 15 is increased by the bias when there is a demisting command.

The step g is followed by temperature control in a step e' which is similar to the step e. For controlling the opening of the air mixing damper 17 during the temperature control in the step e', however, a required temperature $T_{OF}$ (which is experimentally predetermined) of air to be discharged in the demisting mode is computed and stored in the RAM 12-3 in a step h. The temperature $T_{OF}$ can be given by:

$$T_{OF} = -K_1(T_A - 25) + Z \quad (3)$$

when $T_A < 25°$ C., and can be given by:

$$T_{OF} = Z \quad (4)$$

when $T_A \geq 25°$ C., where $K_1$ and Z are constants, and $K_1 > 0$. The temperature $T_{OF}$ is illustrated in FIG. 3(d).

In a step i, a limit value for the opening of the air mixing damper 17 is computed according to the following formula:

$$K_2 \times (T_{OF} - T_E - M) \quad (5)$$

where $K_2$ and M are constants.

The limit value for the opening of the air mixing damper 17 can be indicated by the broken lines in FIG. 3(c) on the opening pattern of the air mixing damper 17 with respect to the combined data T. The opening of the air mixing damper 17 is limited to limit values $\theta_1$, $\theta_2$, for example. Thus, the opening of the air mixing damper 17 is limited as by the broken lines in FIG. 3(c) dependent on the data T.

After the step e', the mode selector dampers 20, 21 are controlled in a step j to close the vent outlet 31 and the heated-air outlet 32 and open the demisting-air outlet 32, followed by the execution of the step b.

Therefore, when there is a demisting command, the amount of air delivered by the air blower 15 is greater by a corrective value than the amount of air delivered by the air blower 15 in an automatic adjusting mode. The temperature control in the demisting mode is effected according to the equations (3) and (4) required for demisting and the opening of the air mixing damper 17 is limited by the formula (5), irrespectively of the opening of the air mixing damper 17 to achieve the temperature of air discharged which is required to attain a desired cabin temperature in the automatic adjusting mode. The opening of the air mixing damper 17 is controlled as if through a limiter having a variable limit value dependent on the ambient-air temperature $T_A$.

In the illustrated embodiment, the intake damper 14 is controlled to switch between the air recirculating position and the ambient-air introducing position. However, the intake damper 14 may be arranged to be able to assume an intermediate position between these air recirculating position and the ambient-air introducing position, so that the intake damper 14 can be controlled into the intermediate position dependent on the ambient-air temperature and the opening of the air mixing damper 17 for introducing a mixture of cabin recirculating air and ambient air.

With the present invention, as described above, the amount of air delivered by the air blower in the demisting mode is made greater by a corrective value than the amount of air delivered by the air blower in the automatic cabin temperature control mode, and the opening of the air mixing damper in the demisting mode is controlled so as to depend on at least the ambient-air temperature. Therefore, the driver and passengers, if any, will not feel excessively hot in the demisting mode. The air-conditioning apparatus does not emit an undue amount of heat into the automobile cabin during seasons of comfortable weather and can keep the cabin air at a moderate temperature while effecting an optimum demisting operation.

When the ambient air is of a high temperature, the air-conditioning apparatus can prevent the front windshield from getting frosted due to condensation of moisture on the outer surface of the front windshield. The air-conditioning apparatus of the invention can also demist the front windshield when the ambient air is of a low temperature.

Although a certain preferred embodiment has been shown and described, it should be understood that many changes and modifications may be made therein without departing from the scope of the appended claims.

What is claimed is:

1. An automobile air-conditioning apparatus in an automobile having a cabin, comprising:
    an intake damper openable and closable for controlling a first passage for circulating air in the cabin and a second passage for introducing ambient air through a duct means into the cabin;
    an air blower disposed in said duct means between said intake damper and said cabin for drawing air from said intake damper into said cabin, said air blower connected to a drive source for adjusting an amount of air fed by said air blower from said intake damper;
    a cooling system including an evaporator interposed in said duct means between said air blower and said cabin;
    a heater core interposed in said duct means between said evaporator and said cabin for heating air that has passed through said evaporator;
    an air mixing damper interposed in said duct means between said evaporator and said heater core for controlling an amount of air that has passed through said evaporation and is to be fed to said heater core;
    a mode selector damper means interposed in said duct means between said heater core and said cabin for selectively opening and closing a demisting-air outlet, a venting outlet, and a heated-air outlet, each of which connect said duct means to said cabin;
    a control system for controlling an amount of air fed from said air blower and an amount of air fed through said evaporator through said air mixing damper to said heater core responsive to a difference between a temperature preset by a temperature setting unit and a temperature of air in said cabin to automatically adjust the temperature of air in said cabin when said control system is set in an automatic adjusting mode, said control system operable when set in a demisting mode with the demisting-air outlet being open to control said device source to increase the amount of air fed from said air blower to an amount greater than the amount of air fed from said air blower when said control system is set in said automatic adjusting mode;
    an evaporator-temperature sensor for detecting a temperature of air between said evaporator and said air mixing damper;
    an ambient-air temperature sensor for detecting a temperature of ambient air outside of said cabin; and
    said control system also limiting the opening of said air mixing damper to control the amount of air fed through said evaporator to said heater core dependent on a temperature detected by said evaporator-temperature sensor and a temperature detected by said ambient-air temperature sensor when said control system is set in said demisting mode with said demisting-air outlet being open.

2. An automobile air-conditioning apparatus in an automobile having a cabin, comprising:
    duct means for recirculating air in said cabin and for introdicing ambient air into said cabin;
    an intake damper disposed in said duct means, said intake damper movable to at least a first position at which air is recirculated through said duct means to said cabin and to a second position at which ambient air is introduced into said cabin;
    an air blower for blowing air through said duct means into said cabin, said air blower interposed in said duct means between said intake damper and said cabin and a drive source connected to said air blower for actuating said blower to change a flow rate of air into said cabin;
    cooling system including an evaporator interposed in said duct means between said air blower and said cabin;
    a heater core interposed in said duct means between said evaporator and said cabin for heating air passes through said evaporator;
    an air mixing damper interposed in said duct between said evaporator and said heater core, actuator means connected to said air mixing damper to selectively vary a proportion of air fed to said heater core from said evaporator;
    a demisting-air outlet disposed in said duct means between said heater core and said cabin;
    a venting outlet disposed in said duct means between said heater core and said cabin;
    a heated-air outlet disposed in said duct means between said heater core and said cabin;
    mode selector damper means for selectively opening and closing said demisting-air outlet, said venting outlet and said heated-air outlet;
    evaporator-temperature sensor means for detecting a temperature of air between said evaporator and said air mixing damper;
    ambient-air temperature sensor means for detecting a temperature of ambient air outside said cabin;
    cabin air temperature sensor means for detecting a temperature of air in said cabin;
    temperature setting unit means for presetting a desired cabin temperature; and
    control system means for controlling at least said drive source of said blower and said air mixing damper, said control system electrically connected to at least said drive source, said actuator means, said mode selector damper means, said evaporator-temperature sensor means, said ambient-air temperature sensor means, said cabin-air temperature sensor means, and said temperature setting unit means, said control system being operable in an automatic adjusting mode to adjust the flow rate of air delivered by said air blower to said cabin by controlling said drive source and to vary the proportion of air fed to said heater core by said air mixing damper in response to a difference between the desired temperature preset by said temperature setting unit means and the temperature in said cabin detected by said cabin-air temperature sensor means, said control system being operable in a demisting mode to actuate said mode selector damper means to open said demisting-air outlet, to control said drive source to increase the flow rate of air delivered by said air blower to an amount greater than that supplied in said automatic mode and to vary the proportion of air fed to said heater core by said air mixing damper in response to the temperature detected by said evaporator-temperature sensor means and the temperature detected by said ambient-air temperature sensor means.

* * * * *